United States Patent [19]

Kearsley et al.

[11] Patent Number: 4,545,357
[45] Date of Patent: Oct. 8, 1985

[54] PROGRAMMABLE TEMPERATURE CONTROL SYSTEM

[75] Inventors: Walter H. Kearsley, Chatham; David L. Wendt, Raleigh Township, Kent County, both of Canada

[73] Assignee: Canadian Fram Limited, Chatham, Canada

[21] Appl. No.: 554,157

[22] Filed: Nov. 22, 1983

[51] Int. Cl.⁴ ............................................. F02M 31/00
[52] U.S. Cl. ........................................ 123/556; 123/552
[58] Field of Search ............... 123/556, 552; 236/13, 236/86, 101 C

[56] References Cited

U.S. PATENT DOCUMENTS

| | | | |
|---|---|---|---|
| 2,414,296 | 1/1947 | Gill | 123/556 |
| 3,450,118 | 6/1969 | LeBig | 123/556 |
| 3,814,071 | 6/1974 | Buchwald | 123/552 |
| 4,244,343 | 1/1981 | Yamaguchi | 123/556 |
| 4,259,936 | 4/1981 | Bach | 123/556 |
| 4,292,949 | 10/1981 | Bendig | 123/556 |
| 4,295,454 | 10/1981 | Iida | 123/556 |

Primary Examiner—Ronald H. Lazarus
Attorney, Agent, or Firm—Markell Seitzman

[57] ABSTRACT

An air temperature control system for an engine including an intake manifold, an air mixing housing in communication with said intake manifold; the system includes a control unit means, responsive to at least one engine operating parameter and to the temperature of the air delivered to the intake manifold for generating an actuator control signal in accordance with a stored programmed temperature profile; actuator means responsive to the actuator control signal and mechanically linked to the movable air mixing valve for adjusting the air mixing valve in proportion to the actuator control signal; and means for sensing the temperature of the mixed air delivered to the intake manifold.

4 Claims, 1 Drawing Figure

PROGRAMMABLE TEMPERATURE CONTROL SYSTEM

BACKGROUND AND SUMMARY OF THE INVENTION

The present invention relates to a programmable control system for controlling the temperature of the air available to the intake manifold of an engine.

The present invention is an improvement to the generally known class of thermocontrol systems utilized to control the temperature of the air input to an engine. These prior systems attempt to maintain the input air temperature at a single, fixed level such as 100° F. (38° C.) by utilizing a vacuum actuator located within an intake duct or tube of an air cleaner. Typically the air cleaner housing comprises a cold air inlet and a warm air inlet. The relative amount of cold or warm air permitted to enter the engine is controlled by a mixing valve which moves relative to these inlets under the control of engine vacuum. Engine vacuum is often modulated by a bi-metal temperature device situated within the air cleaner housing. When this type of device is incorporated within the smaller sized four cylinder engine, sufficient vacuum may not be available to adequately control the mixing valve under all operating conditions. A further deficiency of these prior systems is that the temperature is not matched to the variable engine conditions resulting in inefficiencies in operation.

In contrast the present invention provides for a flexible, programmable thermocontrol system for controlling the temperature of the air ingested by an engine and provides the flexibility for modifying the temperature profile in accordance with variations in engine load and other operating conditions. Accordingly the invention comprises:

An air temperature control system for an engine including an intake manifold, an air mixing housing in communication with the intake manifold. The housing includes a first inlet adapted to receive unheated air and a second inlet adapted to receive heated air and an air mixing valve movable in relation to the first and second inlets for controlling the relative quantity of heated and unheated air available to the intake manifold. The system further includes a control unit, responsive to at least one engine operating parameter and to the temperature of the air delivered to the intake manifold for generating an actuator control signal; and an actuator responsive to the actuator control signal that is mechanically linked to the movable air mixing valve for adjusting the air mixing valve in proportion to the actuator control signal. A temperature sensor located in the air cleaner housing is used to measure the temperature of the mixed air delivered to the intake manifold.

DETAILED DESCRIPTION OF THE DRAWING

Figure 1:
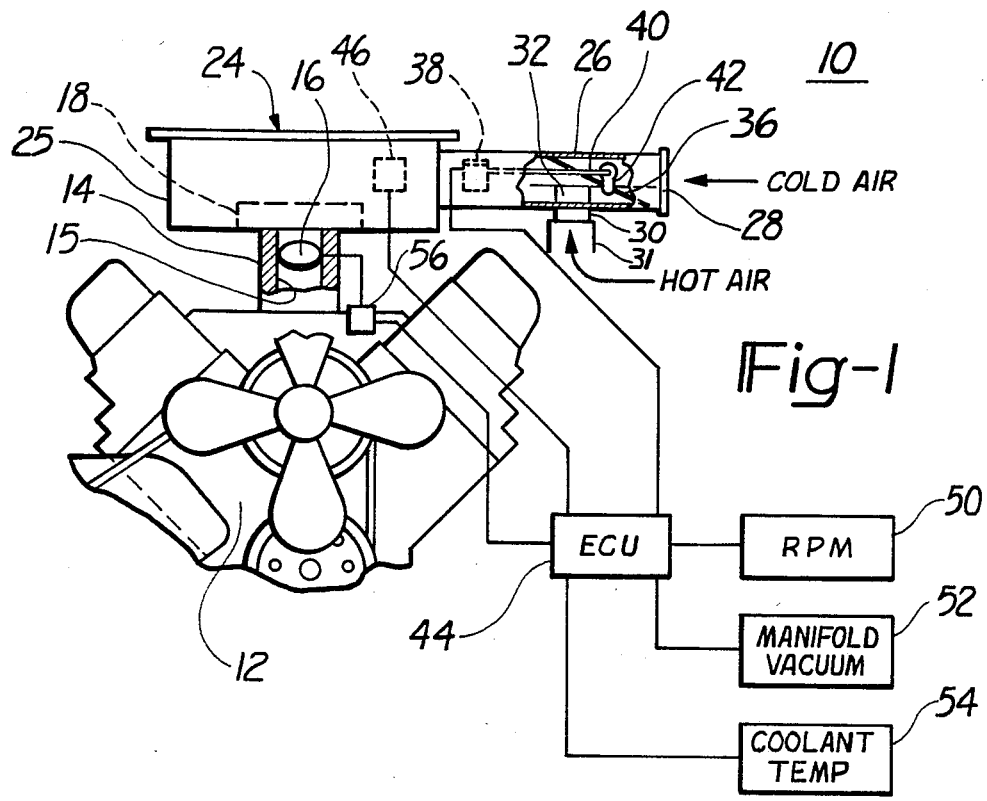

FIG. 1 illustrates a schematic diagram of an electronic thermocontrol system 10 used in conjunction with an engine 12 having an intake manifold 14. The intake manifold defines an intake passage 15 for ingested air. A throttle 16 of a known variety is lodged with intake passage 15 and is movable in a known manner by the vehicle operator through appropriate linkage (not shown). A carburetor or throttle body, generally designated as 18, is mounted to the intake manifold upstream of the throttle 16 in a known manner. The system 10 includes a housing 24, such as an air cleaner, having an inlet tube 26 extending from a central portion 25 located proximate the carburetor or throttle body 18. The inlet tube 26 comprises a first or cold air inlet 28 and a second or warm air inlet 30. The first inlet 28 is exposed to ambient air while the second inlet 30 is attached in a known manner by a heat pipe or tube 31 to the exhaust manifold of the engine so as to make available a source of heated air. The second duct 30 terminates within the inlet tube 26 at an end or seat 32. A movable mixing valve such as flapper valve 36, is rotatably hinged within the inlet tube 26 and movable by an actuator such as a linear actuator 38 so as to be able to close off the source of hot air by seating upon seat 32, close off the flow of cold air from inlet 28 or attain a plurality of positions intermediate thereto.

A push rod 40 and link 42 connects the linear actuator to the hinge point of the mixing valve 36. The linear actuator 38 is responsive to signals generated by an electronic control unit (ECU) generally designated as 44. Electronic control units, such as ECU 44, are common place and well known within modern automotive technology.

The system further includes a temperature sensor 46 mounted downstream of the mixing valve 36 and preferably located proximate the intake manifold within the air cleaner 24. The temperature sensor 46 generates a temperature signal indicative of the temperature of the air available to the engine, such signal being communicated to the ECU 44. The system further includes a plurality of sensors 50-56 for sensing such operational parameters of the engine such as RPM (50), vacuum manifold (52), coolant temperature (54) and throttle position (56). These sensors are similarly connected to the ECU 44.

The system may operate under a number of fixed or variable programmed regimes. In general, the ECU 44 generates an activation signal to the linear actuator 36 to move the mixing valve to control the temperature within the air cleaner housing 24 such that the temperature corresponds to the program temperature profile stored within the ECU 44. As an example, such stored temperature profile may be a fixed value or variable insteps or continuously variable. The desired temperature profile may vary inversely with the speed of the engine from a nominal setting. Alternatively, the ECU 44 may have stored therein a stepwise discrete desired temperature profile having a first value corresponding to the desired air temperature at engine idle, a second value which is preferably lower than the idle temperature corresponding to part throttle operation and a third value corresponding to the desired temperature during wide open throttle operation. The idle, part throttle and wide open throttle conditions can be sensed by monitoring engine RPM, throttle position and/or manifold engine vacuum pressure. Under each of the above operating conditions, the ECU 44 compares the temperature within the air cleaner 24, as sensed by the temperature sensor 46, to the programmed desired temperature and generates the signal to the linear actuator 38 to vary the position of the mixing valve 36 to minimize the temperature differential.

A further alternate of the invention provides the ECU 44 with means for providing a time delay or bypass feature for use during those operating conditions wherein the throttle is in a wide open situation. In operation the ECU would sense the condition of wide open throttle and generate a signal to the mixing valve 38 which causes the mixing valve to close off the hot air inlet 30 thereby providing cooler more dense air to the engine durin wide open throttle conditions. After a predetermined interval established by the time delay or after the throttle has been moved from its wide open position, as sensed by the throttle position sensor 56, the normally generated temperature differential signal is again supplied to the linear actuator to thereafter control the mixing valve in order to maintain the temperature within the air cleaner housing at the then established desired temperature level.

Many changes and modifications in the above described embodiments of the invention can, of course, be carried out without departing from the scope thereof. As an example, the ECU may utilize the coolant temperature and manifold vacuum to bypass the normally generated temperature differential signal and require the mixing valve to seal off the hot air inlet 30 only during situations after the engine has warmed up.

Having thus described the invention what is claimed is:

1. An air temperature control system for an engine including an intake manifold, an air mixing housing in communication with said intake manifold, said housing having a first inlet adapted to receive unheated air and a second inlet adapted to receive heated air and an air mixing valve movable in relation to said first and second inlets for controlling the relative quantity of heated and unheated air available to the intake manifold, characterized in that said system further includes:

a control unit means, responsive to at least one engine operating parameter and to the temperature of the air delivered to said intake manifold for generating an actuator control signal;

an electric linear actuator responsive to said actuator control signal and mechanically linked to said movable air mixing valve for adjusting said air mixing valve in proportion to said actuator control signal;

means for sensing the temperature of the mixed air delivered to said intake manifold wherein said sensing means is located downstream of said first and second second inlets; and wherein said control unit means includes means for temporarily removing said actuator control signal when said throttle has been moved to its wide open position and substituting therefor a second actuator control signal to close said second inlet.

2. The system as defined in claim 1 wherein said control unit means further includes means for generating said actuator control signal to move said mixing valve such that the temperature of the air available to said intake manifold varies inversely in proportion to engine RPM.

3. The system as defined in claim 1 wherein said second actuator control signal is generated for a predetermined interval or until said throttle has been moved a predetermined amount from its wide open position.

4. The system as defined in claim 2 wherein said intake manifold temperature is varied in discrete steps corresponding to idle, part open throttle, and wide open throttle operation.

* * * * *